United States Patent Office

3,495,664
Patented Feb. 17, 1970

3,495,664
PNEUMATIC WELL DRILLING
John Kelly, Jr., Arlington, Tex., assignor to Mobil Oil Corporation, a corporation of New York
No Drawing. Filed Sept. 15, 1967, Ser. No. 668,181
Int. Cl. E21b 33/13, 21/04; E21c 7/06
U.S. Cl. 175—69
14 Claims

ABSTRACT OF THE DISCLOSURE

This specification discloses a pneumatic drilling process in which an oil-wetting surfactant and a hydrophobic liquid such as a petroleum oil are introduced into the well in order to render exposed formation faces water-resistant. The surfactant and hydrophobic liquid may be introduced into the well as a mixture. The mixture may be dispersed in the gaseous drilling fluid or a batch of the surfactant-hydrophobic liquid may be introduced into the well and circulation of the drilling fluid thereafter suspended for a desired period of time.

BACKGROUND OF THE INVENTION

Field of the invention

This invention relates to the drilling of wells into the earth's crust, and more particularly to a new and improved pneumatic drilling method in which subterranean formations penetrated by a well are treated in order to render them water-resistant.

Description of the prior art

Typically, wells are extended into the earth's crust to desired subterranean locations, e.g., oil and/or gas-bearing formations, through the application of rotary drilling techniques. In the rotary drilling of a well a drilling fluid is circulated through the well in order to remove the cuttings therefrom. This is accomplished by pumping the drilling fluid downwardly through a rotating drill string within the well and thence upwardly to the surface of the well through the annulus surrounding the drill string. The drill cuttings are entrained in the drilling fluid and withdrawn from the well with the fluid. In addition to removing cuttings, the drilling fluid also serves other functions such as cooling the bit.

In many rotary drilling procedures the drilling fluid is a liquid such as water or oil, either alone or in the form of a "mud," i.e., a water or oil-base liquid having suspended solids therein. Another rotary drilling technique which is becoming increasingly prevalent is pneumatic drilling in which a gaseous drilling fluid is used. Various advantages are attendant to the use of gas as a drilling fluid. For example, the gas is oftentimes much cheaper than the more conventional oil or water-base muds and, in addition, drilling usually can be accomplished at a much greater rate. In addition, the life of the drill bit often is prolonged and the likelihood of damaging a producing formation is reduced.

Although pneumatic drilling procedures have in many instances proven to be quite advantageous, considerable difficulties have been experienced due to the entry of water into the well during the drilling procedure. One problem is that the drill cuttings may tend to coagulate and stick to the drill pipe and to the wall of the well thus making removal of the cuttings from the well difficult. In addition to the coagulation of drill cuttings, another difficulty presented when water is encountered during pneumatic drilling operations is due to the deleterious effects of such water on the formations penetrated by the well. The water may enter the well in such amounts that an accumulation thereof remains in the bottom of the well causing a sloughing of the wall of the well at the drilling zone. Also, the water may be blown from the well out of the annulus and pass a region of the well susceptible to this condition, causing sloughing of the well wall at a point above the drilling zone.

Numerous techniques have been proposed for the purpose of alleviating the difficulties presented by such water intrusion. For example, as disclosed in U.S. Patent No. 3,155,178 to W. H. Kirkpatrick et al., it has been proposed to introduce waterproofing agents, such as calcium stearate, into the well in order to make the cuttings water-repellent so as to prevent their coagulation and gumming up within the well. Another procedure described in U.S. Patent No. 2,818,231 to W. A. Freeman, Jr., et al. involves the entrainment within the gaseous drilling fluid of a vaporized low-boiling organohalosilane such as trimethylchlorosilane. The organohalosilane, which may be dissolved in a relatively volatile solvent such as toluene, benzene, etc., is said to form a water-repellent surface on the wall of the well, thus minimizing entry of water into the well. In addition, the organohalosilanes are said to prevent coagulation of the cuttings within the well.

SUMMARY OF THE INVENTION

In accordance with the present invention, there is provided a pneumatic drilling method in which one or more formations penetrated by the well are rendered water-resistant. This is accomplished by introducing into the well being drilled and into contact with a formation penetrated thereby an oil-wetting surfactant and a substantially nonvolatile hydrophobic liquid. The surfactant and liquid coat the formation face exposed in the well and render it resistant to water which may be encountered during drilling operations. Preferably, a portion of the surfactant and liquid in excess of that which coats the formation face is withdrawn from the well with the drilling fluid.

The oil-wetting surfactant and hydrophobic liquid may be introduced into the well and into contact with the formation by any suitable procedure. Thus, the surfactant and liquid may be dispersed into the gaseous drilling fluid at the surface as it is introduced into the drill string. However, in a preferred embodiment of the invention, a batch of the surfactant and hydrophobic liquid is introduced into the well and circulation of the drilling fluid through the well is suspended for a period of time in order to allow the surfactant and hydrophobic liquid to accumulate in the bottom of the well. Thereafter, such circulation is resumed and the accumulated surfactant and liquid are displaced upwardly within the annulus from the bottom of the well.

DESCRIPTION OF SPECIFIC EMBODIMENTS

In pneumatic rotary drilling a gaseous drilling fluid such as air, natural gas, or nitrogen is circulated through the well during the rotary drilling operation. The drilling fluid is compressed to a suitable delivery pressure, e.g., on the order of 100 p.s.i. or more, and introduced into the well via the rotating drill string. The gaseous drilling fluid flows downwardly through the drill string and outwardly into the well bore through outlet ports in the drill bit secured to the lower end of the drill string. The drilling fluid is introduced into the well under sufficient pressure and volume such that the drill cuttings are swept out of the drilling zone and lifted to the surface of the well through the annulus between the drill string and the wall of the well. At the surface of the well the gaseous drilling fluid with the cuttings entrained therein exits from the annulus through a conduit, commonly termed a "blooey" pipe, and is vented to the atmosphere.

When water is encountered during such drilling operations it tends to become at least partially entrained within the gaseous drilling fluid and is moved upwardly through the well within the annulus. Such water may act upon the formations penetrated by the well with certain deleterious effects. Typical of formations which may be adversely affected by the presence of water are the shales which contain hydratable clays. As the water contacts the face of a shale formation in the well, the formation tends to swell or fracture and ultimately may slough into the well, thus causing difficulties in the drilling operation. For example, the drill pipe may become stuck thus necessitating expensive fishing procedures. In more serious cases, there is even danger of losing the well through destabilization of the well bore from a reaction of the entrained water with the formation minerals.

In carrying out the present invention, one or more formations penetrated by the well are contacted during the pneumatic drilling procedure with an oil-wetting surfactant in order to render them resistant to water which may be entrained within the circulating gaseous drilling fluid. As will be understood by those skilled in the art, by the term "oil-wetting surfactant," as used herein and in the appended claims, is meant a surface-active agent which has oleophilic characteristics and which upon adsorption on the exposed formation face within the well causes the face of the formation to be preferentially oil-wettable, i.e., more readily wetted by oil than by water. The oil-wetting surfactant which is adsorbed onto the face of the formation typically will form a monomolecular film in which an oleophilic hydrocarbon group is directed outwardly away from the solid surfaces of the formation. Thus, the surfactant adsorbed on the face of the formation exposed within the well renders it water-resistant.

In addition to the oil-wetting surfactant, the formation under treatment also is contacted by a suitable hydrophobic liquid such as diesel oil. The hydrophobic liquid increases the water-resistant characteristics of the formation and provides for the retention of these characteristics for a prolonged period of time. In this regard, the hydrophobic liquid forms a protective film over the adsorbed oil-wetting surfactant and thus greatly reduces desorption of the surfactant from the formation face by water entrained in the gaseous drilling fluid.

The surfactant utilized in the present invention may be any agent, or a mixture of several compatible agents, which renders the exposed face of the subterranean formation preferentially oil-wettable. Illustrative of such surfactants are the higher alkyl quaternary ammonium salts having one or more long-chained alkyl groups. For example, the oil-wetting surfactant may be an alkyltrimethylammonium chloride or a dialkyldimethylammonium chloride in which the carbon chain length of the alkyl group or groups is from 8 to 18. Examples of commercially available alkyltrimethylammonium chlorides and dialkyldimethylammonium chlorides are Arquad–18 and Arquad–2HT–75, respectively, available from Armour Chemical Company.

Other suitable oil-wetting surfactants are the aliphatic polyethenoxy tertiary amines of the following general formula:

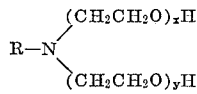

wherein:

R is an aliphatic group having from 12 to 18 carbon atoms, and $x$ and $y$ each are within the range of 1 to 5.

Examples of commercially available ethenoxylated amines of this group are Ethomeen C/12, Ethomeen 18/12, and Eethomeen S/12 by Armour Chemical Comany. Substituted ammonium salts formed as the reaction products of these ethenoxylated tertiary amines with organic or inorganic acids also may be used. Of these, the products formed by reaction with the high molecular weight monobasic acids normally exhibit greater oil solubility than the corresponding tertiary amines and are particularly useful.

As a further example of oil-wetting surfactants which may be used are ethenoxylated tertiary diamines of the general formula:

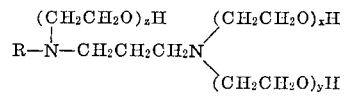

wherein:

R is an aliphatic group having a carbon chain length of 12 to 18, and $x$, $y$, and $z$ each are within the range of 1 to 5.

A commercially available diamine of this type is Ethduomeen T/13, available from Armour Chemical Company.

Additional oil-wetting surfactants which may be used in carrying out the invention are the polyvalent salts of the high molecular weight fatty acids such as palmitic, stearic, and oleic acid. Examples of such salts, commonly termed "heavy metal soaps," are aluminum oleate, zinc stearate and calcium stearate.

The hydrophobic liquid utilized in the present invention is substantially nonvolatile such that it exhibits a low volatility within the well bore. This will result in a relatively stable nonvolatile film over the formation surface which is not subject to extensive evaporation in the presence of the gaseous drilling fluid circulating through the annulus. By the term "substantially nonvolatile," as used herein and in the appended claims, is meant a liquid having a boiling point or average boiling point in excess of 300° F. at atmospheric pressure. Thus, the above-quoted term includes a liquid such as crude oil which has low boiling constituents so long as it is formed predominantly of consituents exhibiting boiling points above 300° F. Exemplary of the hydrophobic, substantially nonvolatile liquids which may be used in carrying out the invention are petroleum crude oils and various relatively high boiling point cuts thereof such as diesel oil. Inverted aqueous emulsions of such oils in which the oil is in the continuous phase also may be used. It will be recognized that the above-designated surfactants and liquids are exemplary only and that other hydrophobic liquids and oil-wetting surfactants may be utilized in carrying out the invention.

The oil-wetting surfactant and the substantially nonvolatile hydrophobic liquid may be introduced into the well concurrently or sequentially. When introduced sequentially, it normally will be desirable for the surfactant to precede the hydrophobic liquid. Thus, the surfactant may be entrained in the gaseous drilling fluid, either alone or dissolved or dispersed in a suitable carrier fluid, and carried down the well by the drilling uuid. Thereafter, the diesel oil or other substantially nonvolatile hydrophobic liquid is introduced into the well.

Preferably, the oil-wetting surfactant and the substantially nonvolatile hydrophobic liquid are introduced into the well and into contact with the formation as a mixture. The surfactant may be mixed with the hydrophobic liquid to form either a solution or dispersion, depending upon the solubility characteristics of the surfactant. For example, the quarternary ammonium salts such as described above are water-soluble, oil-dispersible compounds and may be incorporated in the hydrophobic liquid as a dispersion. The above-described ethenoxylated amines vary from oil to water solubility and may be dissolved or dispersed in the hydrophobic liquid as indicated.

The relative concentrations of the oil-wetting surfactant and hydrophobic liquid used in carrying out the invention will vary depending upon the nature of the well under treatment and the type of surfactant used. In general, however, it is desirable to use between one-half to forty pounds of oil-wetting surfactant for each 100 gallons of hydrophobic liquid. In any case, the amount of liquid used should be well in excess of the amount of surfactant in order to provide an adequate coating of liquid over the surfactant film adsorbed on the formation surfaces. This will prevent an unacceptably high rate of desorption of the surfactant from the formation surfaces by water entrained in the drilling fluid.

In general, the amount of oil-wetting surfactant and hydrophobic liquid used is a function of the hole size and also the depth of the well. It is desirable to use a sufficient amount of the treating agents to ensure coverage of the open hole not covered by a preceding treatment. As a general rule, the total volume of the hydrophobic liquid and surfactant should be within the range of about 1 to 5 barrels applied for each 30 to 90 feet of well drilled. In any case, it is preferred to utilize the treating agents in amounts such that a portion of the oil-wetting surfactant and hydrophobic liquid introduced into the well is returned to the surface with the gaseous drilling fluid circulated through the annulus. This usually will ensure that adequate amounts of the treating agents are used to provide coverage for the wall of the well.

While the mixture of oil-wetting surfactant and hydrophobic liquid may be introduced, either continuously or intermittently, into the gaseous drilling fluid and carried into the well as a mist-like dispersion in the drilling fluid, it is preferred that a batch of the mixture be introduced into the well and allowed to accumulate in the bottom of the well. The mixture may be introduced through the annulus or drill string as desired although it usually will be more practical to introduce the mixture via the drill string. Preferably, circulation of the gaseous drilling fluid is suspended for a period of time subsequent to the introduction of the mixture into the well in order to allow the liquid-surfactant mixture to accumulate undisturbed in the bottom of the well and also to allow the formation adjacent the bottom of the well to "soak" in the mixture. This will ensure good contact of the surfactant-hydrophobic liquid with the surface of the formation and lead to the production of an effective water-repellent film. Preferably, a period of at least 5 minutes is allowed before resuming circulation of the gaseous drilling fluid. When circulation of the gaseous drilling fluid is resumed, the accumulated liquid and surfactant is displaced up the annulus from the bottom of the well. The mixture moves through at least the lower portion of the well as a slug which tends to block the annulus thus providing good contact with the formation surfaces.

It is preferred that the batch of surfactant and hydrophobic liquid be injected in an amount of at least one barrel. In a typical pneumatic drilling operation in which the well is drilled utilizing a 9-inch bit and a 4½-inch drill pipe, this volume of treating liquid will provide for slug flow through the annulus in at least the lower 50 feet of the well. A treating batch of 3 barrels usually will provide for slug flow through at least the bottom 200 feet of the well and it is preferred to utilize at least this amount. Normally, the batch of treating liquid should not exceed 5 barrels in order to avoid undesirably large changes in the hydrostatic pressure at the bottom of the well. It is preferred to apply the batch treatment procedure once for each 30 to 90 feet of well which is drilled although it may be applied at greater intervals, particularly where fast drilling rates are experienced.

This embodiment of the invention was tested in a well drilled by air in a locality in which ordinarily troublesome shale beds are present. The well was provided with 10¾-inch casing set at approximately 820 feet and was drilled utilizing a 9-inch drill bit and a 4½-inch drill pipe. The drill string was provided with approximately 270 feet of 7-inch drill collar immediately above the bit.

When the well had been drilled to a depth of approximately 1100 feet the rotary drilling operation and the circulation of a gaseous drilling fluid were terminated. A section of the drill string was broken at the surface of the well and 3 barrels of treating fluid were injected into the drill string. The treating liquid was a mixture of Ethomeen S/12 and diesel oil in a proportion of about 3 gallons (23 pounds) of surfactant to 200 gallons of oil. After a period of 10 minutes subsequent to the introduction of the treating liquid, air circulation was resumed. After less than 1 minute of air circulation a fairly good slug of approximately 1 barrel of treating liquid emerged from the blooey line. Thereafter, the normal rotary drilling operation was resumed. The well was drilled with air to a depth of over 3,000 feet utilizing this procedure once for every 60 to 150 feet drilled and no difficulty was experienced with sloughing of the wall of the well at points above the drilling zone. At approximately 3,200 feet the well bridged near the bottom of the hole and the test was discontinued. While the cause of the bridge could not be ascertained with certainty, it apparently was not due to water since no measurable amounts of water could be detected in the drilling returns.

In most cases, the use of the aforementioned surfactant and hydrophobic liquid will impart adequate water-resistant properties to the geologic strata penetrated by the well. However, in some cases it may be desired to impart even greater water-resistant characteristics to the formation, particularly in those instances where unusually large amounts of water are encountered during drilling operations. In this case, it is preferred to add asphalt to the hydrophobic liquid or hydrophobic liquid-surfactant mixture. Such asphalt may be the residual bitumens obtained from the refining of petroleum crude oils. Also, the so-called "blown asphalts" may be utilized. As will be understood by those skilled in the art, by the term "blown asphalt" is meant asphaltic bitumens which have undergone an oxidative treatment by being exposed to air, oxygen or some other oxidative environment, usually at elevated temperatures. The concentration of asphalt in the hydrophobic liquid will depend to a large extent on local conditions encountered in the well being drilled. A preferred concentration of asphalt will be within the range of 10 to 100 pounds per 100 gallons of diesel oil or other hydrophobic liquid. Usually, it will be desirable to avoid using more than 125 pounds of asphalt per 100 gallons of other hydrophobic liquid.

Having described specific embodiments of the instant invention, it will be understood that further modifications thereof may be suggested to those skilled in the art, and it is intended to cover all such modifications as fall within the scope of the appended claims.

What is claimed is:

1. In the pneumatic drilling of a well penetrating a subterranean formation, the method comprising:
   introducing a predominantly gaseous drilling fluid into a drill string within said well and circulating said drilling fluid into contact with said formation and upwardly through the well annulus surrounding said drill string to the surface of said well to remove cuttings therefrom, and
   introducing an oil-wetting surfactant and a substantially nonvolatile hydrophobic liquid into said well and moving said surfactant and said hydrophobic liquid through said annulus by the circulation of said predominantly gaseous drilling fluid and into contact with said formation whereby the face of said formation exposed in said well is coated by said surfactant and said liquid and rendered water-resistant.

2. The method of claim 1 further comprising withdrawing a portion of said introduced surfactant and said liquid from said well with said drilling fluid.

3. The method of claim 1, wherein said hydrophobic liquid contains asphalt.

4. The method of claim 1, wherein said surfactant and said hydrophobic liquid are introduced into said well as a mixture.

5. The method of claim 4, wherein said surfactant-hydrophobic liquid mixture is introduced into said well in an amount within the range of 1 to 5 barrels for each 30 to 90 feet of well drilled.

6. The method of claim 4, wherein said surfactant-hydrophobic liquid mixture is entrained in said drilling fluid as said drilling fluid is introduced into said drill string and further comprising withdrawing a portion of said surfactant and said liquid from said well with said drilling fluid.

7. The method of claim 4, wherein said surfactant-liquid mixture is introduced into said well as a batch and further comprising suspending circulation of said drilling fluid for a time period subsequent to the introduction of said mixture to allow said mixture to accumulate in the bottom of said well and thereafter resuming circulation of said drilling fluid to displace said mixture upwardly within said annulus.

8. The method of claim 7 further comprising withdrawing a portion of said mixture from said well as a slug.

9. The method of claim 7, wherein circulation of said drilling fluid is suspended for a period of at least 5 minutes subsequent to the introduction of said mixture.

10. The method of claim 7, wherein at least one barrel of said mixture is introduced into said well.

11. The method of claim 7, wherein said mixture is introduced into said well in an amount within the range of 1 to 5 barrels.

12. The method of claim 11, wherein the introduction of said mixture as a batch is repeated at a drilling interval within the range of 30 to 90 feet.

13. The method of claim 7, wherein at least 3 barrels of said mixture is introduced into said well.

14. The method of claim 7, wherein said surfactant-liquid mixture contains asphalt.

References Cited

UNITED STATES PATENTS

| | | | |
|---|---|---|---|
| 2,773,670 | 12/1956 | Miller | 166—30 X |
| 2,818,231 | 12/1957 | Freeman et al. | 175—68 |
| 3,065,791 | 11/1962 | Bearden et al. | 175—71 X |
| 3,141,503 | 7/1964 | Stein | 166—29 |
| 3,155,178 | 11/1964 | Kirkpatrick et al. | 175—69 |
| 3,240,280 | 3/1966 | Stratton et al. | 175—71 |
| 3,323,593 | 6/1967 | Foshee et al. | 175—69 X |
| 3,394,758 | 7/1968 | Terry et al. | 175—71 X |

STEPHEN J. NOVOSAD, Primary Examiner

U.S. Cl. X.R.

166—294; 175—68